United States Patent [19]

Miller et al.

[11] Patent Number: 5,647,269
[45] Date of Patent: Jul. 15, 1997

[54] BEVERAGE WATER HEATING APPARATUS FOR AIRPLANES

[75] Inventors: Paul E. Miller; Steve D. Lowrie, both of Fullerton, Calif.

[73] Assignee: Weber Aircraft, Fullerton, Calif.

[21] Appl. No.: 325,982

[22] Filed: Oct. 19, 1994

[51] Int. Cl.⁶ ..................................................... A47J 31/00
[52] U.S. Cl. ................................................. 99/279; 99/300
[58] Field of Search .......................... 99/279, 280, 281, 99/282, 283, 300, 301, 302 R, 307; 122/13.1, 504, 506, DIG. 15; 137/467, 860

[56] References Cited

U.S. PATENT DOCUMENTS

| | | | |
|---|---|---|---|
| 3,589,385 | 6/1971 | Vitous | 99/307 |
| 3,650,201 | 3/1972 | Jovanovic | 99/279 |
| 4,782,744 | 11/1988 | Bunn | 99/307 |
| 4,871,089 | 10/1989 | Rader | 99/301 |
| 5,063,838 | 11/1991 | Matuschek | 99/307 |

FOREIGN PATENT DOCUMENTS

| | | | |
|---|---|---|---|
| 1294609 | 5/1969 | Germany | 99/300 |

*Primary Examiner*—David Scherbel
*Assistant Examiner*—Randall E. Chin
*Attorney, Agent, or Firm*—Lyon & Lyon

[57] ABSTRACT

A beverage water heating supply system. A tank stores water while heaters heat the water. The heated water is distributed through a manifold assembly, which has a multiplicity of components, to a coffee brewer water and a hot water spigot which are controlled by independent solenoid valves. The water is filtered before entering the tank and is filtered a second time before leaving the tank to enter the manifold assembly. The tank employs a combination temperature sensing and water level detection circuit probe to prevent over heating and heating when the tank is not full. The manifold assembly includes a pressure release valve, a blowout port backup pressure release valve, an automatic vent valve, a brewer water pickup, a lower hot water pick up, and a pressure compensating flow control for the brewer water. The manifold is quickly connected to and disconnected from the tank with a bayonet type connection without removing any of the connections to the manifold. A lock and release lever is provided for locking the manifold to the tank. Upon removal of the manifold from the tank, a large opening is available for removing the filter from the tank and cleaning the inside of the tank.

37 Claims, 6 Drawing Sheets

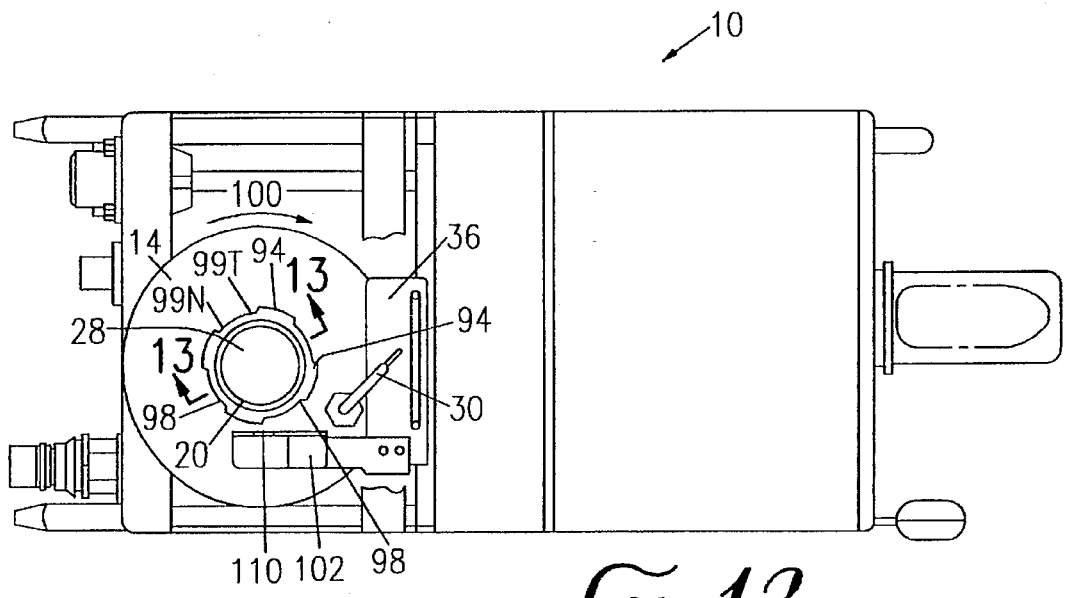
_fig.12_
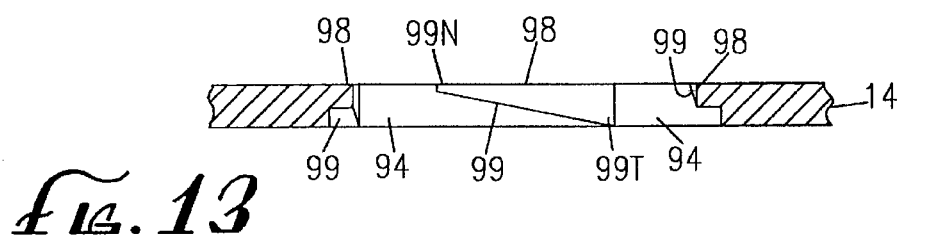
_fig.13_
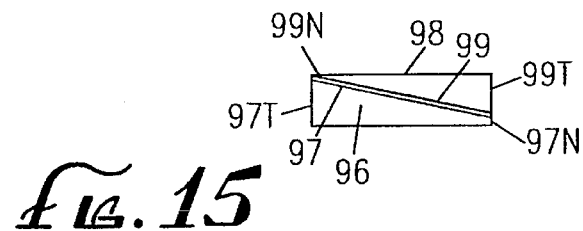
_fig.15_
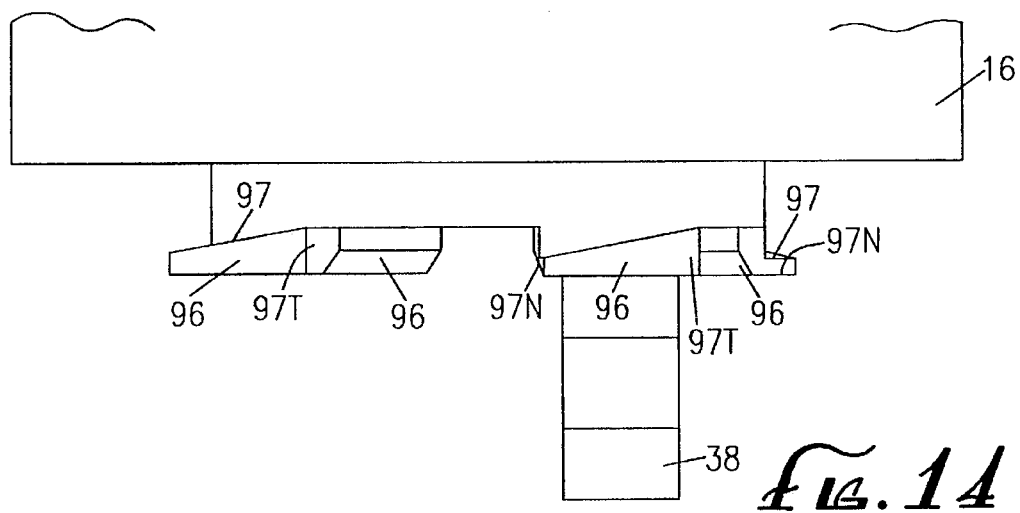
_fig.14_

BEVERAGE WATER HEATING APPARATUS FOR AIRPLANES

BACKGROUND OF THE INVENTION

The field of the present invention is apparatus for heating water for beverages, such as coffee and tea, and particularly for use in passenger service systems in commercial airline planes.

Commercial airlines have attempted to make air travel a comfortable and pleasant experience. To that end, airlines have provided in-flight beverage services to their passengers, but providing hot beverages such as coffee and tea to airplane passengers has not proven to be a simple task. The quality of the available water is not consistent in all airports and often contains high concentrations of minerals that become deposited in the water heating tank. As a result some airlines have required cleaning the heating tank used to produce the hot water for hot beverages as often as once a month. Considering the present construction of heating tanks, cleaning the inside of the tank and the tank's heaters is a long and labor intensive task requiring the removal of as many as five separate fastening devices on the top of the heating tank alone. Further, using five separate connectors to assemble the heating tank increases the likelihood of leaking and improper reassembly.

More importantly, heating water in an enclosed tank can create dangerously high pressures possibly resulting in explosions. For this reason, pressure release valves have been integrated into heating tank designs to reduce the frequency and severity of such catastrophes. However, the pressure release valve is typically sealed within the tank or some integral component thereof, and if the valve can be serviced at all it is only by disassembly of the heating tank. Thus, the chance that the servicing of the pressure release safety valves might be delayed or omitted resulting in the malfunction of a safety release valve is increased.

Finally, because of the weight and space concerns inherent in air travel, the airlines are constantly searching for elements that may be combined or even eliminated.

SUMMARY OF THE INVENTION

The present invention is directed to an improved beverage water heating apparatus for airplanes and, in particular, to an improved manifold assembly that includes a plurality of the required connections and devices within its structure.

It is an object of this invention to provide such a manifold assembly including an adjustable pressure release valve, a brewer water pick up having a pressure compensating flow control, a low level hot water pick up, an automatic vent valve, a hot water outlet, a brewer water outlet, an over pressure-automatic vent outlet port, and a pressure release blowout port.

Another object of this invention is to provide a manifold assembly having one or more arcuate flanges for insertion into a water heating tank whereby rotation of the manifold seals the manifold assembly to the water heating tank.

Another object of this invention is to provide an automatic vent valve which is a float valve and a pressure compensating flow control which is an adjustable needle valve, and a single means for locking both the pressure relief valve and needle valve at the desired settings.

Still another object of this invention is to provide a manifold assembly attached to a combination heating and storage tank that seals an aperture in the tank. The combination heating and storage tank comprises a dual stage filter, one or more heaters, a single probe having both a temperature sensor and water level detection circuit, a water inlet, and the above-mentioned aperture. The tank can also have a locking lever which engages the manifold assembly preventing its inadvertent rotation and removal.

Still another object of the invention is to provide a tank with an easily accessed aperture having a sufficiently large size that allows the dual stage filter to be removed for cleaning and the inside of the tank to be cleaned without disassembling the tank, which aperture also serves to mount the manifold assembly.

A still further object of this invention is to provide a backup pressure relief system which is a pressure release blowout port incorporated into a manifold assembly and comprising a housing containing a flexible sealing member and having an aperture in the housing. The flexible sealing member can be an O-ring or other washer which can be forced out of the narrow and elongated aperture by an over pressure.

Other and further objects and advantages of this invention will appear from the following description of preferred embodiments and the accompanying drawings in which similar reference characters denote similar elements throughout the several views.

BRIEF DESCRIPTION OF THE DRAWINGS

FIG. 6 is a cross sectional view taken along line 6—6 in FIG. 4 showing a low level hot water pick up.

FIG. 7 is a cross sectional view taken along line 7—7 in FIG. 4 showing a brewer water pick up with a needle valve embodiment of a pressure compensating flow control.

FIG. 12 is a top view of a heated beverage supply system with the manifold assembly removed.

FIG. 13 is an enlarged cross sectional view taken along line 13—13 in FIG. 12 showing the flange locking areas in the top of the tank.

FIG. 14 is an enlarged plan view of the bottom of a manifold assembly viewed from between the solenoid valves and showing the flanges on the bottom of the manifold assembly.

FIG. 15 is a schematic view illustrating the engagement between a flange locking area and a flange.

DETAILED DESCRIPTION OF THE PREFERRED EMBODIMENTS

Figure 1:
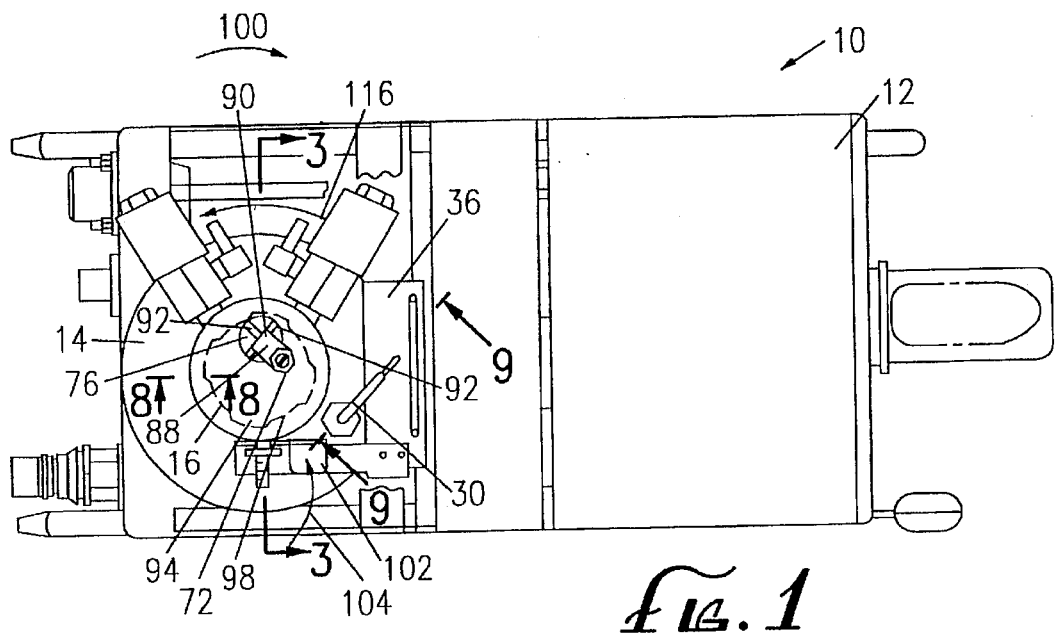
FIG. 1 is a top plan view of a heated beverage supply system with the manifold assembly of this invention in an operative position attached to a heating tank.

Turning in detail to the drawings, FIG. 1 shows a heated beverage supply system, generally designated as 10, having a dispensing cabinet 12, a combination heating and storage water tank 14 mounted with a hanging bracket 36 on the back of the dispensing cabinet 12, and a manifold assembly 16 attached to the top of the tank 14. The hot water dispensing and coffee brewing portions of the beverage supply system may be of conventional types, are not part of the present invention and therefore will not be described in detail.

Figure 3:
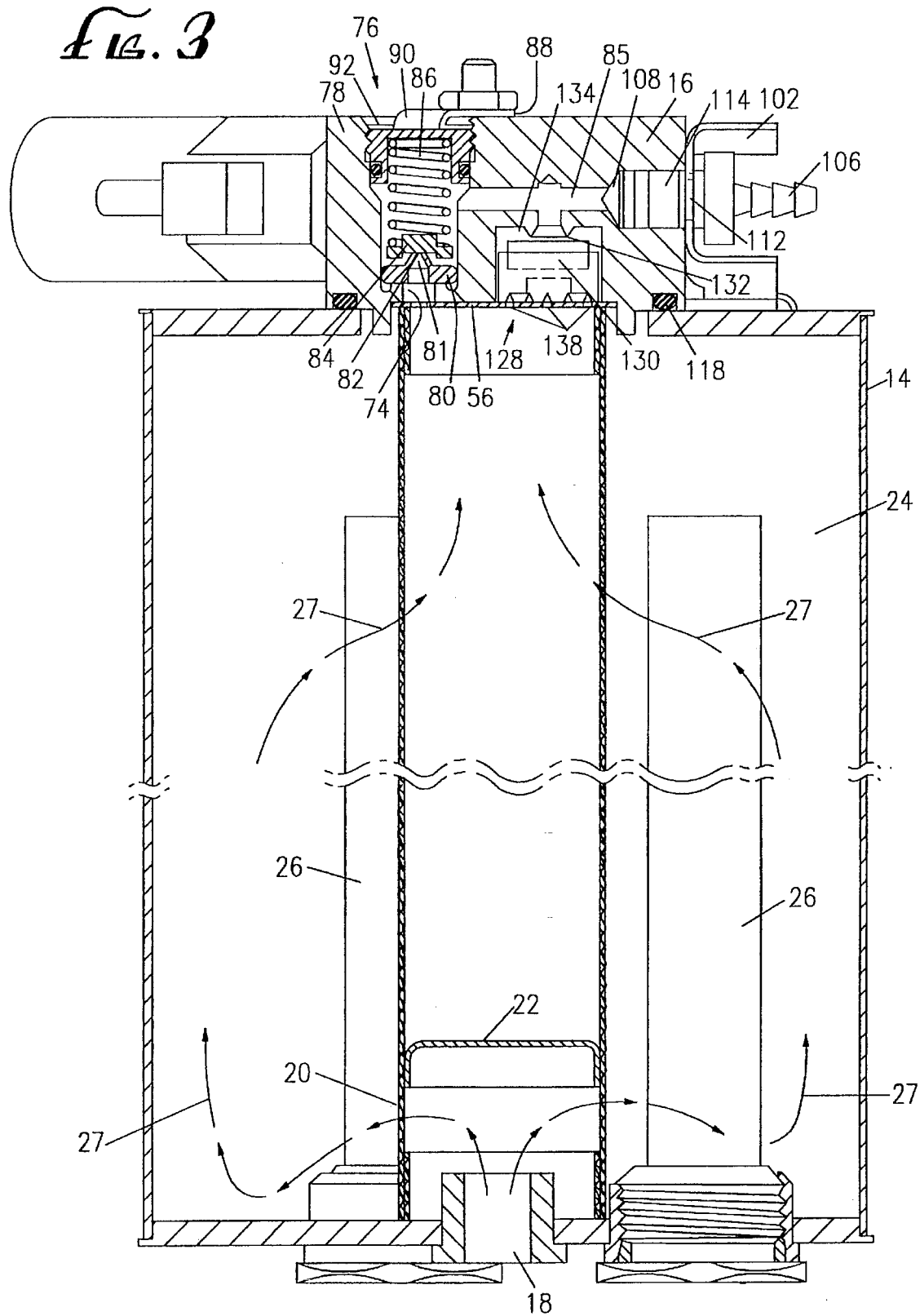
FIG. 3 is an enlarged cross section taken along line 3—3 of FIG. 1 illustrating the general operation of a dual stage filter and the internal structure of a pressure release valve and automatic vent valve.

A preferred embodiment of the combination heating and storage tank 14 which is manufactured to withstand an internal test pressure of 400 pounds per square inch, is shown in cross section in FIG. 3. The water flow through the tank 14 is illustrated by arrows 27 and is described as follows. The tank is supplied continuously with water through the water inlet 18. The water enters the tank 14 inside of a cylindrical dual stage filter 20. After the water initially enters the tank 14, it is forced through the filter 20 by a bottle cap shaped deflector 22 which completely fills the internal cross sectional area of the filter 20. By filtering the incoming water, any particles contaminating the aircraft's potable water supply are prevented from entering the heating chamber area 24 of the tank Further, the deflector 22 deflects the incoming cold water outwardly to the bottom of the heating area 24 thereby delaying the mixing of the incoming water with the heated water already in the chamber 24. After the water is deflected to the bottom of the chamber 24, it circulates around the cylindrical heating elements 26 and progressively flows to the top of the chamber 24 as it is heated and hot water is dispensed from the top. In the embodiment shown, three evenly spaced heating elements 26 are used within the chamber 24. However, any number and arrangement of heating elements 26 can be used. Before the water can exit through the manifold assembly 16, it is forced to pass inwardly through the filter 20 again. This second stage of filtering prevents sediment particles or other debris from leaving the heating chamber 24 and contaminating the devices and passage ways of the manifold assembly 16. The filter 20 also prevents sediment particles or other debris from flowing back into the aircraft's potable water system when the tank 14 is drained after flight or for maintenance.

The opening 28 in the top of the tank 14 shown in FIG. 12 is of sufficient size to allow the removal of the filter 20 for cleaning. Further, the size of the opening 28 allows access to the tank interior for cleaning the heaters 26 and removing any sediment or debris from the heating chamber 24, without disassembling of the tank 14.

Figure 9:
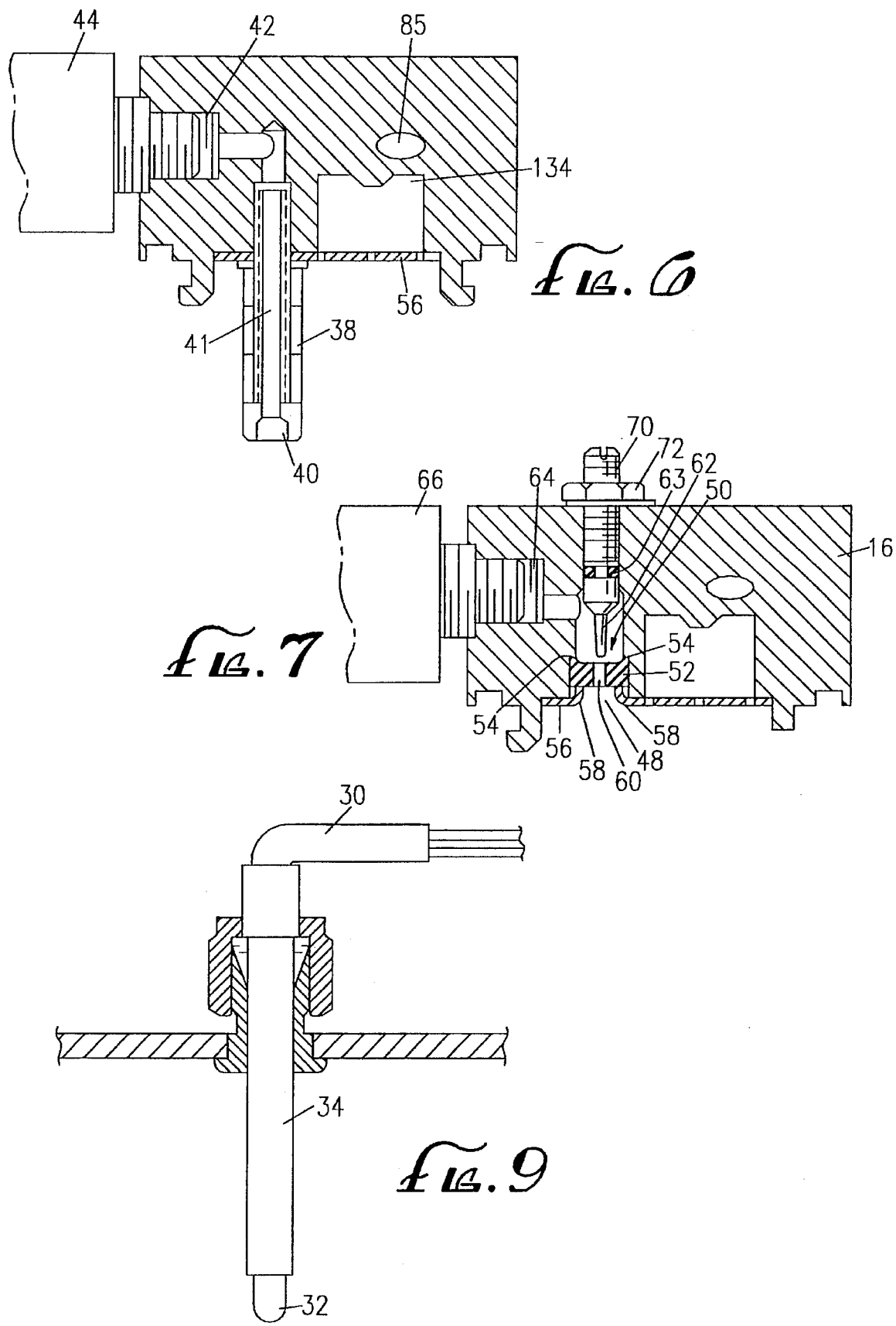
FIG. 9 is a cross sectional view taken along line 9—9 in FIG. 1 showing a dual function water probe.

The top of the tank as shown in FIG. 1 incorporates a multi-function probe 30. Referring to the details of the probe shown in FIG. 9, the tip 32 of the probe 30 is exposed below an insulating sheath 34 and serves as a temperature sensing device, the output of which is used to regulate the function of the heating elements 26. Also, the probe functions as a water level detection device. Power may only be supplied to the heating elements 26 when the water is high enough to close an open circuit between the temperature sensing tip 32 and the electrically grounded tank 14, thus preventing the heaters from functioning unless the temperature sensitive tip 32 is immersed in water. Therefore, the heaters cannot function with a low level of water in the tank 14 which prevents super heating the water in the chamber 24. Thus, the probe prevents damage to the heating elements as well as the entire heated beverage supply system 10 and helps to prevent the occurrence of over pressure conditions.

The manifold assembly 16 seals the opening 28 in the top of the tank 14 and is shown attached to the tank 14 in FIG. 1. The manifold 16 contains two water inlet ports or pickups shown in FIG. 5. The bottom view of the manifold 16 in FIG. 5 shows the manifold bottom plate 56, to be described later, attached to the manifold 16. The first pickup is a hot water pick up 38. As shown in the cross section in FIG. 6, the hot water pick up 38 extends downward from the manifold assembly 16, when installed, into the tank 14 and thus takes water from a lower point in the tank 14 which is typically five degrees fahrenheit cooler than the water at the top of the tank 14. This provides hot water at the appropriate temperature to make tea or similar beverages while allowing hotter water to be produced at the top of the tank for the coffee brewer. The water flows through the hot water pick up inlet 40, and the hot water pickup tube 41, and into the hot water outlet port 42. The hot water then flows into the hot water solenoid valve 44 which, referring to FIG. 4, controls the hot water flow through a fitting 46 to a flexible tube (diagrammatically shown by dot-dash line 46a) connected to a conventional hot water spigot (not shown). The hot water solenoid valve 44 is operated by control wires 44a, 44b. Referring back to FIG. 6, the hot water pick up 38 also holds the manifold bottom plate 56 in place. The specific functions of the manifold bottom plate 56 will be discussed below in conjunction with other manifold assembly devices.

The second pick up is the coffee brewer water pick up 48 shown in FIGS. 5 and 7. Referring to the cross sectional detail in FIG. 7, the brewer water pick up 48 is located at the top of the tank 14, when the manifold assembly 16 is installed, thereby supplying the brewer with the hottest water available in the heating chamber 24. The brewer water pick up 48 is equipped with a pressure compensating flow control, generally designated as 50. In the embodiment shown by FIG; 7, the pressure compensating flow control 50 is a form of needle valve. To that end, a flexible member 52 is placed in the inlet of the brewer water pick up 48. In a preferred embodiment shown, the flexible member 52 is a washer. The outer edge of the flexible member or washer 52 is restricted from upward movement by a ledge 54 in the wall of the brewer water pickup 48, and the manifold bottom plate 56 is curved upwardly at 58 into the brewer water pick up inlet and holds the washer 52 against the ledge 54. The water flows through a centrally located orifice 60 extending through the washer 52, and as the flow of the brewer water increases through the orifice 60, the central portion of the orifice 60 is pushed upward toward a needle 62. As the flow of the brewer water through the orifice 60 continues to increase, the central portion of the washer 52 containing the orifice 60 is moved closer to the needle 62, and the closer the orifice 60 is moved to the needle 62, the more restricted the flow of the brewer water through the orifice 60 becomes. After flowing through the orifice 60, the brewer water flows into the brewer water outlet port 64 and then into the brewer water solenoid valve 66. The brewer water solenoid valve 66 then controls the flow of hot water through a fitting 68 and flexible tubing (diagrammatically shown by dot dash line 68a) to the conventional coffee brewer (not shown). The brewer water solenoid 66 is controlled and operated by control wires 66a, 66b to provide the correct amount of hot water for brewing a pot of coffee in the conventional manner.

Referring back to FIG. 7, the needle valve 50 may be adjusted to allow higher or lower flow rates to the brewer water solenoid 66 by raising and lowering the needle 62. The needle 62 is attached to a threaded member 70 which is threaded into a lock nut 72. Having the threaded member 70 protruding from the top of the manifold 16, creates the possibility for leaks, so the needle valve 50 is sealed with an O-ring 63. By turning the threaded member 70 clockwise, the member 70 is threaded farther into the lock nut 72, and when the threaded member 70 is threaded farther into the lock nut 72, the needle 62 is moved closer to the orifice 60 with the result that the brewer water flow through the orifice 60 is further restricted or decreased. If the threaded member 70 is turned counterclockwise thereby threading it out of the lock nut 72, the needle 62 is moved farther away from the orifice 60 which allows for increased flow of the brewer water through the orifice 60. The needle 62 can be locked into the desired position to set a maximum flow through the orifice 60 by tightening the lock nut 72 against the manifold assembly 16.

Referring to FIG. 5, the bottom of the manifold assembly 16 also contains a pressure release orifice 74 which allows the water in the tank 14 to exert pressure against the pressure release valve, shown generally as 76, in FIG. 3. The pressure release valve 76 has a top member 78 which is threaded into the manifold assembly 16. The pressure release valve 76 also has bottom member 80 which has a valve seat 82 on its top, a sealing member 84 rests on the valve seat 82 and normally prevents water in the tank from escaping through the orifice 81 in the bottom member 80. A spring 86 is interposed between the top member 78 and the sealing member 84. The spring 80 is held in compression between the top member 78 and the sealing member 84 thereby holding the sealing member on the valve seat 82 against the pressure of the water in the tank 14. If a state of over pressure exists in the tank 14, the pressure will overcome the compression force of the spring 86 and lift the sealing member 84 off the valve seat 82 thereby relieving the pressure in the tank 14. The water escaping through the relief valve flows through the internal passage 85 to the vent valve outlet port 108 and out the vent drain fitting 106 to a flexible drain line (diagrammatically shown by dot dash line 106a). An O-ring 93 seals the pressure relief valve 76 to the manifold assembly 16 to prevent hot water from escaping out the top of the relief valve 76. The pressure relief valve 76 is adjustable. The top member 78 may be threaded farther into and out of the manifold assembly 16 with a blade head screwdriver inserted into a groove 92. Threading the top member 78 farther into the manifold 16 increases the compression in the spring 86 and thereby increases the pressure required to lift the sealing member 84 off the valve seat 82 and relieve the pressure. If the top member 78 is threaded farther out of the manifold assembly 16, then the compression in the spring 86 is lowered, thus reducing the amount of pressure required to lift the sealing member 84 off the valve seat 82 relieving the pressure. The preferred setting is 65 pounds per square inch, but the pressure relief valve 76 can be set between 55 and 75 pounds per square inch. The pressure release valve 76 can be locked at the desired relief pressure by a locking bracket 88. The locking bracket 88 has a hole through which the threaded member 70 of the needle valve passes and a curved portion 90 which fits into the groove 92 in the top member 78. The locking bracket 88 locks the top member from rotation when the locking nut 72 of the needle valve 50 tightens the locking bracket 88 against the manifold assembly 16. Thus, only a single element and step is required to lock both the pressure relief valve 76 and the needle valve 50 at the desired settings. Finally, because the top member 78 can be completely threaded out of the pressure relief valve 76, the valve 76, unlike its prior counter parts, can be cleaned regularly leading to a significant reduction in pressure relief valve failures.

Figure 4:
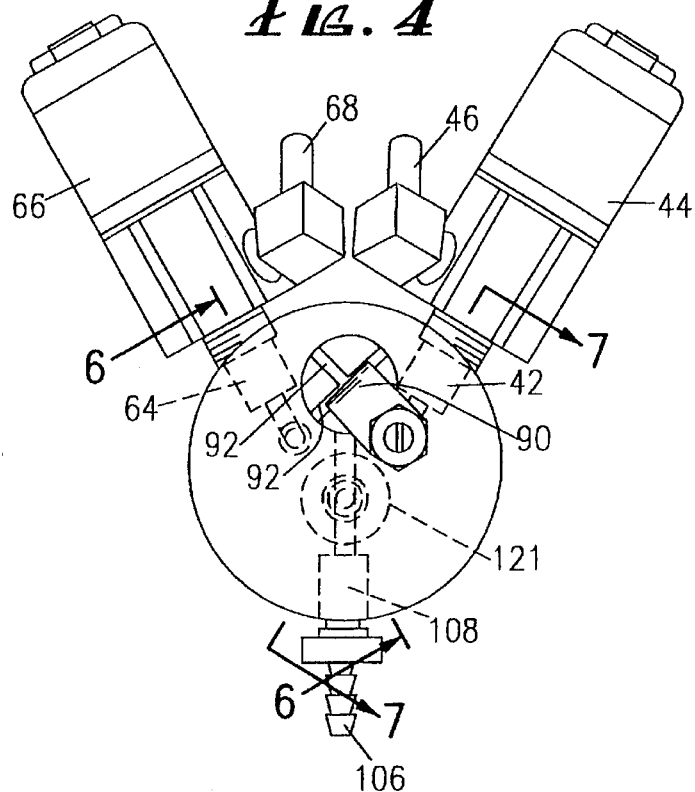
FIG. 4 is the top view of a manifold assembly.
Figure 5:
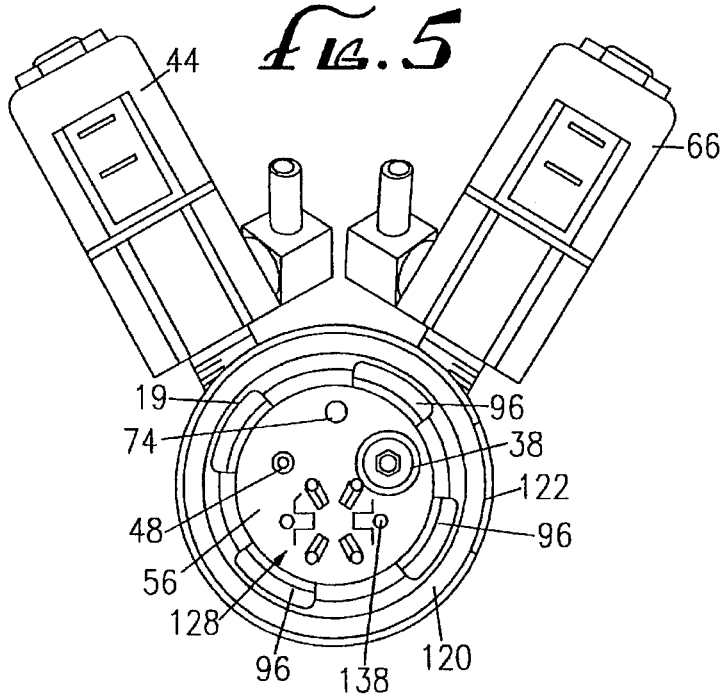
FIG. 5 is the bottom view of a manifold assembly.

Referring to FIG. 4, the manifold 16 has another orifice 121, shown in dashed lines, for the automatic vent valve, generally designated as 128 in FIG. 3. Looking to the cross section of the automatic vent valve 128, when the tank 14 is being filled or drained, the automatic vent valve 128 allows air to flow in and out of the tank 14 during draining and filling respectively, without opening any other valves and it seals the tank 14 when the tank 14 is full of water. The automatic vent valve 128 includes a seal member 130 that remains in a lower position while air flows between the tank and passage 85 in either direction. The clearance around seal member 130 is larger enough to allow upward air flow without moving the seal member 130 upwardly but sufficiently small so that when water flows upwardly from the tank 14 around the seal member 130 toward the passage 85, the seal member 130 is urged upwardly against the valve seat 132 by the water flow. Thus, the automatic vent valve is closed when the water in the tank 14 is high enough to move the seal member 130 against the valve seat 132. The water pressure in the tank 14 keeps the tank 14 sealed by holding the seal member 130 against the valve seat 132. When the tank 14 is being drained, the small amount of air that was trapped while the tank was being filled in the portion of the automatic vent valve chamber 134 which is higher than the automatic vent valve seat 132 expands, allowing the seal member 130 to recede from the valve seat 132 with the water. Air is then allowed to enter through the vent drain fitting 106, through the internal passage 85, into the automatic vent valve chamber 134, through orifices 138 in the manifold bottom plate 56, and into the tank 14 thereby preventing a negative pressure in the tank and allowing the tank to drain. When the tank 14 is drained, the seal member 130 comes to rest on the manifold bottom plate 56. Thus, the manifold bottom plate retains the seal member 130 within the vent valve 128. Further, the seal member 130 is of a size and the orifices 138 are dispersed such that the seal member 130 cannot cover all of the orifices 138 at the same time. When the tank 14 is being refilled, the air in the tank flows through the orifices 138 into the internal passage 85 and out the vent drain fitting 106 thereby preventing the build up of any positive pressure in the tank and allowing the tank to be filled until the seal member 130 is urged by the water against the valve seat 132. Rather than relying on the seal member 130 being urged upwardly by the water flow, it can be made of a buoyant material that would cause the seal member 130 to float into the sealing position against the valve seat 132.

Figure 2:
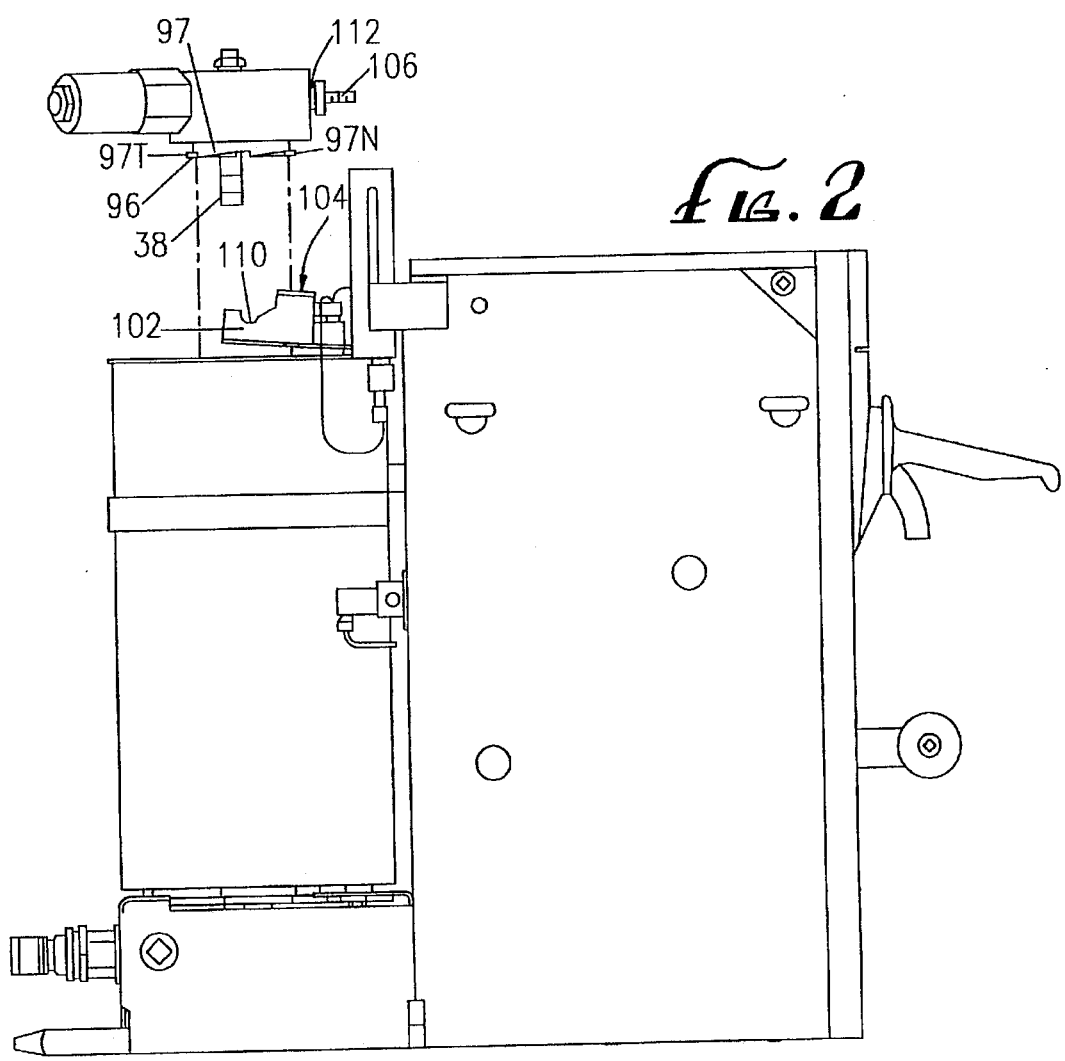
FIG. 2 is a side view of the heated beverage supply system of FIG. 1 with the manifold assembly detached and elevated partially out of the heating tank.

In order to reduce maintenance time and the occurrence of leaks, the conventional fasteners used by the prior art to attach a manifold to a tank have been eliminated in favor of a quick release or bayonet type connection as described below. As shown in FIG. 12, the top of the tank 14 has an opening 28. The opening 28 is generally circular but has four areas protruding toward the edge of the tank 14. The four areas 94, better described as flange receiving areas 94, are spaced around the opening 28 and sized to receive the four flanges 96 on the bottom of the manifold assembly 16 as shown in FIG. 5. Though four flanges are used in the embodiment shown, arrangements with any number of flanges are contemplated. The manifold assembly is attached to the tank 14 by lowering the flanges 96 through the flange receiving areas 94, so that the solenoid valves extend toward the rear of the heated beverage supply system 10 as shown in FIG. 2. Once the flanges 96 are inserted into the flange receiving area 94 as shown in FIG. 1, the manifold assembly is turned one-quarter turn in the clockwise direction as indicated by clockwise arrow 100. After the one-quarter clockwise turn 100 is completed, the flanges 96 are held beneath the flange locking areas 98 which are better illustrated in FIGS. 12, 13, and 14. The flanges 96 and flange locking areas 98 have cooperating inclined surfaces 97 and 99 respectively, similar to portions of thread, to cause the manifold assembly 16 to be tightly secured to the top of the tank 14. As the clockwise turn 100 is started, the narrow end 97N of the flange incline surface 97 engages the narrow end 99N of the flange locking area inclined surface 99. During the clockwise turn, the narrow ends 97N and 99N move farther toward the thick ends 97T and 99T pulling the manifold assembly 16 to the tank 14 until the narrow end 97N of the flange incline surface 97 is engaging the thick end 99T of the flange locking area inclined surface 99 and the narrow end 99N of the flange locking area surface 99 is engaging the thick end 97T of the flange inclined surface 97 as shown schematically in FIG. 1B. Thus, the manifold assembly 16.is held tightly to the tank 14. Though the embodiment described uses rotation to engage the flange 96 and the flange locking area 98, embodiments utilizing linear translation to engage a flange with a flange locking area also are contemplated.

Once the one-quarter clockwise turn 100 is completed, a lock and release lever 102 is depressed as shown by arrow 104 in FIG. 1, revealing the vent drain outlet port 108 which is aligned with a cup 110 in the lever 102. With lever 102 depressed, the vent drain fitting 106 is inserted into the vent drain outlet port 108. With the manifold assembly 16 now in this fully installed position, the lever 102 is released. Once the lever 102 is released, the cup 110 of the lever 102 fits into the recessed portion 112 of the vent drain fitting 106 whereby the manifold assembly is locked against inadvertent rotation relative to the tank 14 by the lever 102. Further, if a person were to attempt to remove the vent drain fitting 106 or accidently pull on it while the lever 102 is released, the inserted portion 114 of the vent drain fitting 106, which is of a larger diameter than the cup 110, would contact the lever 102 thereby preventing its removal from the manifold assembly 16. Thus, the lever prevents the accidental removal of the vent drain fitting 106. The recessed portion 112 of the vent drain fitting 106 is contained on both sides by the lever 102 and hence neither the vent drain fitting 106 nor the manifold assembly 16 into which the vent drain fitting 106 is inserted are able to rotate relative to the tank 14. To remove the manifold assembly 16 from the tank 14, the lever 102 is pushed down as shown by arrow 104, thereby removing the cup 110 of the release lever 102 from the recessed portion 112 of the vent drain fitting 106 and freeing the vent drain fitting 106 to be removed from the vent valve outlet port 108 thus allowing rotation of the manifold assembly 16. To finish removing the manifold assembly 16 from the tank 14, the manifold assembly 16 is rotated one-quarter turn in a counter clockwise direction as shown by arrow 116 and then lifted. With the manifold assembly 16 removed from the tank 14, the opening 28 provides access to clean the inside of the tank 14 and heating elements 26. The above bayonet arrangement provides a very quick means for removal and attachment of the manifold 16 without removing any of the tubes or wires that are connected to the manifold assembly except the vent drain fitting. A further advantage is provided in that a manifold needing repair may be quickly detached, replaced with functioning manifold, and taken to a shop for repair. Thus, the heated beverage system is only inoperative for cleaning.

Figure 8:
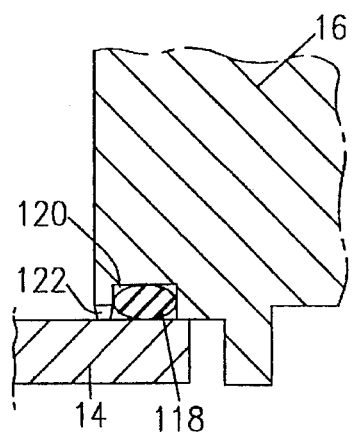
FIG. 8 is a cross sectional view taken along line 8—8 in FIG. 1 showing a pressure release blowout port under a state of normal pressure.
Figure 10:
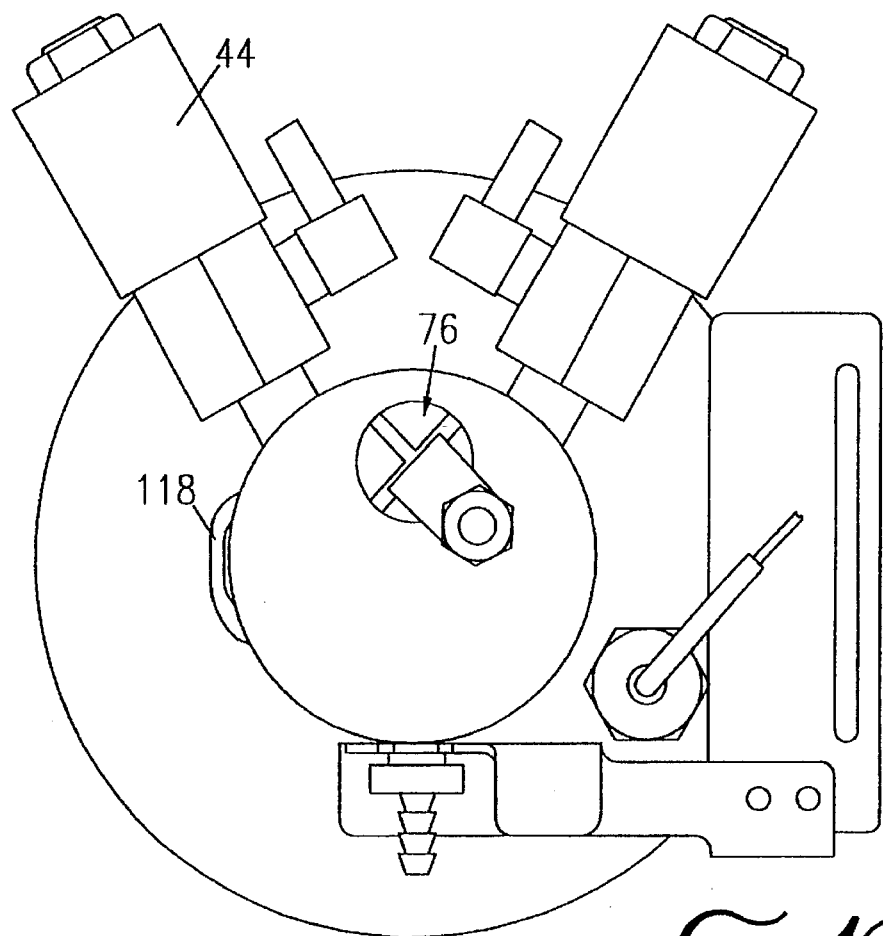
FIG. 10 is a schematic top view of a manifold assembly attached to a tank and illustrating a blowout seal under a state of over pressure.
Figure 11:
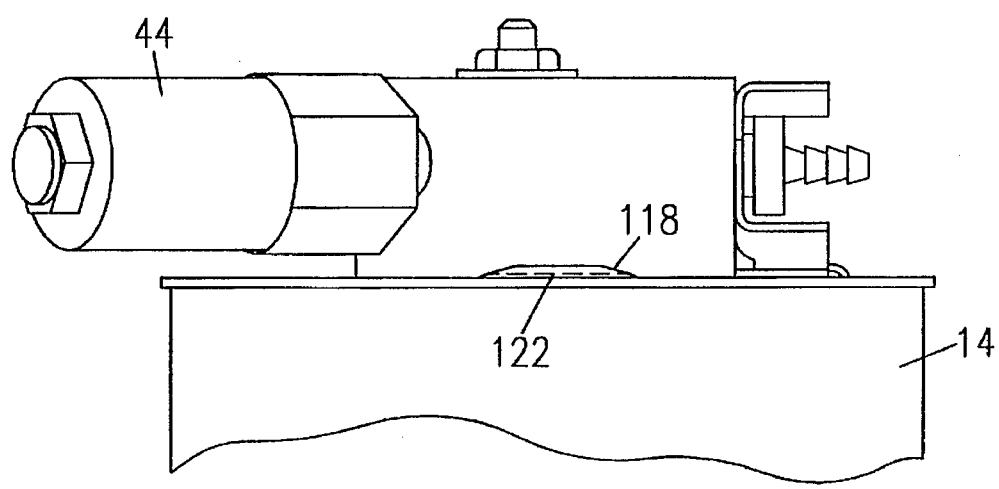
FIG. 11 is a schematic side view of a manifold assembly attached to a tank showing the over pressure blowout seal and port of FIG. 10 under a state of over pressure.

The manifold assembly 16 seals the opening 28 in the tank 14 with an O-ring 118 shown in FIG. 3 by compressing the O-ring against the top of the tank during the clockwise rotation of the manifold assembly during installation, as described above. The O-ring not only maintains the seal between the tank 14 and manifold assembly 16, it also provides a backup pressure release system for extreme over pressure. Referring to FIG. 8, the O-ring 118 is contained within a groove 120 extending around the circumference in the bottom of the manifold assembly 16. Over a short sector of the circumference, a bottom portion of the outer wall of the groove 92 is removed leaving an elongated opening 122 between the manifold assembly 16 and the top of the tank 14. At an extremely high over pressure of approximately 200 psi, such as might occur if the pressure release valve 76 malfunctions, the O-ring 118 will be forced through the elongated opening 122 allowing the pressure to bleed out. FIGS. 10 and 11 schematically show the O-ring in an over pressure state. As illustrated in FIG. 10, the O-ring 118 is forced out of the elongated opening 122 allowing the pressure to bleed out through the elongated opening. In FIG. 11, the O-ring 118 is also shown after having been forced out of the elongated opening 122 which is shown by the dashed line behind the O-ring 118. If the main pressure release valve 76 should malfunction by rusting shut or becoming clogged with debris, the blow out port will act as a backup pressure release valve if the tank experiences an over pressure condition.

Thus, a heating beverage supply system is disclosed which employs a heating tank and a manifold assembly incorporating a multiplicity of devices for providing hot water. While embodiments and applications of this invention have been shown and described, it would be apparent to those skilled in the art that many more modifications are possible without departing from the invention as defined by the appended claims.

What is claimed is:

1. In a manifold assembly for a beverage water heating apparatus having a water heating tank, the manifold assembly comprising a manifold body and a plurality of separate components mounted on said manifold body and in communication with the tank through said manifold body including a pressure relief valve, a brewer water pickup, a separate hot water pickup, a vent valve, a hot water outlet, and a brewer water outlet, said brewer water pickup connected to said brewer water outlet by said manifold body, said hot water pick up connected to said hot water outlet by said manifold body and said manifold body having means for quick connect and disconnect with the tank.

2. The manifold assembly of claim 1 wherein said manifold assembly further includes a pressure release blow out port.

3. The manifold assembly of claim 2 wherein said pressure release blow out port includes an O-ring groove formed in said manifold assembly, an O-ring seal positioned in said O-ring groove for sealing against the tank, and an opening in a portion of said O-ring groove for allowing said O-ring to extrude through said opening upon excess pressure in the tank and to release the pressure.

4. The manifold assembly of claim 1 wherein said quick connect and disconnect means includes a bottom portion on said manifold body and a top portion on the tank, said bottom portion having a flange for locking said bottom portion to said top portion of the tank.

5. The manifold assembly of claim 4 wherein said quick connect and disconnect means further includes a plurality of said flanges.

6. The manifold assembly of claim 1 wherein said vent valve includes means for automatically allowing air in and out of the tank and prevents the outlet of water.

7. The manifold assembly of claim 1 wherein said brewer water pickup includes a pressure compensating flow control.

8. The manifold assembly of claim 7 wherein said pressure compensating flow control includes a flexible member having a flow orifice therethrough and an adjustable needle valve positioned at said orifice for varying a flow rate through said orifice by adjusting said needle valve and flexing of said flexible member toward and away from said needle valve.

9. The manifold assembly of claim 8 wherein said manifold assembly further includes a means for physically locking the position of said pressure compensating flow control and said pressure relief valve.

10. The manifold assembly of claim 1 wherein said manifold assembly further includes a first solenoid valve controlling water flow through said hot water outlet, and a second solenoid valve controlling water flow through said brewer water outlet.

11. The manifold assembly of claim 1 wherein said separate hot water pickup includes means for picking up the water at a lower level than the brewer water pickup.

12. In a manifold assembly for a beverage water heating apparatus having a water heating tank and the manifold assembly for mounting on the tank, a pressure release system comprising a flexible sealing member for sealing between the manifold assembly and the tank, the manifold assembly having a groove for receiving said flexible sealing member, an outer wall adjacent said groove and said outer wall having an aperture through which said flexible sealing member extrudes upon excess pressure to relieve the excess pressure.

13. The manifold assembly of claim 12 wherein said flexible sealing member comprises an O-ring.

14. The of claim 18 wherein the tank has a flat surface on a top of the tank, and said flexible sealing member engages said flat surface on said top of the tank.

15. The manifold assembly of claim 12 wherein said aperture is narrow and elongated.

16. A manifold assembly for an in flight water heating tank comprising a manifold body and a plurality of components mounted on said manifold body and in communication with said tank through said manifold body including an adjustable pressure relief valve, a brewer water pickup having a pressure compensating flow control, a low level hot water pickup, an automatic vent valve, a hot water outlet, a brewer water outlet, and an over pressure automatic vent outlet port, said brewer water pickup connected to said brewer water outlet by said manifold body and said low level hot water pickup connected to said hot water outlet by said manifold body.

17. The manifold assembly for an in flight water heating tank according to claim 16 further comprising a pressure release blow out port.

18. The manifold assembly for an in flight water heating tank according to claim 16 further comprising a bottom having a plurality of arcuate flanges for rotatably locking said bottom to the water heating tank.

19. The manifold assembly for an in flight water heating tank according to claim 16 wherein said pressure compensating flow control is adjustable and comprises a needle valve and a flexible member with an orifice confronting said needle valve.

20. The manifold assembly of claim 16 further comprising a first solenoid valve controlling water flow through said hot water outlet, and a second solenoid valve controlling said brewer water outlet.

21. In a manifold assembly for a beverage water heating apparatus having a water heating tank, an improvement comprising, the tank having a top with a large aperture, the manifold assembly adapted for mounting on said tank top in said aperture in a sealed relationship for pressurizing water in the tank to an elevated pressure during operation, and means for quick connect and disconnect of said manifold assembly to the tank in said sealed relationship when connected, said manifold assembly including, in communication with said tank, a pressure relief valve, a brewer water pickup, a brewer water outlet connected to said brewer water pickup by a manifold body of said manifold assembly, and valve means in said manifold body for controlling the flow of the pressurized water through said brewer water outlet from the tank.

22. The manifold assembly of claim 21 wherein said brewer water pickup includes compensating flow control.

23. The manifold assembly of claim 21 wherein said manifold assembly includes a low level hot water pickup connected to a hot water outlet by said manifold body.

24. The manifold assembly of claim 21 wherein said manifold assembly includes an automatic vent valve.

25. The manifold assembly of claim 21 wherein said manifold assembly includes a pressure release blow out port.

26. The manifold assembly of claim 21 wherein said manifold assembly includes a plurality of separate components mounted on said manifold body including, a pressure compensating flow control in said brewer water pickup, a low level hot water pickup, an automatic vent valve, a hot water outlet from said low level hot water pickup, and a pressure release blow out port.

27. The manifold assembly of claim 26 wherein said quick connect and disconnect means includes a bottom portion on said manifold body and a top portion on the tank, said bottom portion having a plurality of arcuate flanges for rotatably locking said bottom portion to said top portion of the tank by approximately one-quarter turn for accomplishing said quick connection and disconnection.

28. The manifold assembly of claim 27 wherein said manifold assembly includes solenoid valves connected to said brewer water outlet and said hot water outlet, control wires connected to said solenoid valves, and flexible tubes connected to said solenoid valves for conducting hot water through the beverage heating apparatus, said manifold assembly being connectable and disconnectable from the tank for removal of the tank without disconnecting said flexible tubes and control wires from said solenoid valves.

29. The manifold assembly of claim 21 wherein said quick connect and disconnect means includes a bottom portion on said manifold body and a top portion on the tank, said bottom portion having a plurality of inclined flanges for locking said bottom portion to said top portion of the tank.

30. The manifold assembly of claim 29 wherein said inclined flanges are arcuate.

31. The manifold assembly of claims 30 wherein said quick connect and disconnect means further include said top having a plurality of inclined, arcuate flange receiving areas engaging said arcuate flanges whereby said sealed relationship is tightened as said manifold assembly is rotated.

32. The manifold assembly of claim 21 wherein said quick connect and disconnect means includes said top having a plurality of inclined receiving areas for locking said manifold assembly to said top.

33. The manifold assembly of claim 32 wherein said receiving areas are arcuate.

34. A manifold assembly for a beverage water heating apparatus having a water heating tank, an improvement comprising, the tank having a top with a large aperture, the manifold assembly adapted for mounting on said tank top in said aperture in a sealed relationship, and means for quick connection and disconnection of said manifold assembly to the tank in said sealed relationship, said manifold assembly including a pressure relief valve, a brewer water pickup having a compensating flow control, and a brewer water outlet connected to said brewer water pickup.

35. A manifold assembly for a beverage water heating apparatus having a water heating tank, an improvement comprising, the tank having a top with a large aperture, the manifold assembly adapted for mounting on said tank top in said aperture in a sealed relationship, and means for quick connection and disconnection of said manifold assembly to the tank in said sealed relationship, said manifold assembly including a pressure relief valve, a brewer water pickup, a brewer water outlet connected to said brewer water pickup, a low level hot water pickup, and a hot water outlet connected to said low level hot water pickup.

36. The apparatus of claim 35, wherein said manifold assembly includes a solenoid valve connected to said brewer water outlet and a solenoid valve connected to said hot water outlet.

37. A manifold assembly for a beverage water heating apparatus having a water heating tank, an improvement comprising, the tank having a top with a large aperture, the manifold assembly adapted for mounting on said tank top in said aperture in a sealed relationship, means for quick connection and disconnection of said manifold assembly to the tank in said sealed relationship including a bottom portion on said manifold assembly and a top portion on the tank having a plurality of mating inclined flanges on both said portions for releasably locking said bottom portion to said top portion, and said manifold assembly including a pressure relief valve, a brewer water pickup, and a brewer water outlet connected to said brewer water pickup.

* * * * *